June 27, 1939.  L. J. PFISTER  2,163,851
AGRICULTURAL MACHINE
Filed Oct. 22, 1938  3 Sheets-Sheet 3

Inventor
L. J. Pfister

By Clarence A. O'Brien
and Hyman Berman
Attorneys

Patented June 27, 1939

2,163,851

UNITED STATES PATENT OFFICE 2,163,851

AGRICULTURAL MACHINE

Lester J. Pfister, El Paso, Ill.

Application October 22, 1938, Serial No. 236,508

2 Claims. (Cl. 280—80)

This invention relates to new and useful improvements in agricultural machines and particularly machines of a character adapted to move under its own power through a field of corn and which embodies a novel construction and arrangement for supporting a number of workers in a manner to permit the tassels of a plurality of rows of corn to be removed simultaneously.

The present invention has particular reference to an agricultural machine embodying the subject matter of Patent No. 2,095,007, granted to me under date of October 5, 1937, and entitled "Agricultural machine".

More particularly the invention has reference to a wheel-supporting structure for the frame forming part of said invention.

The invention together with its objects and advantages will be best understood from a study of the following description taken in connection with the accompanying drawings wherein.

Figure 1:
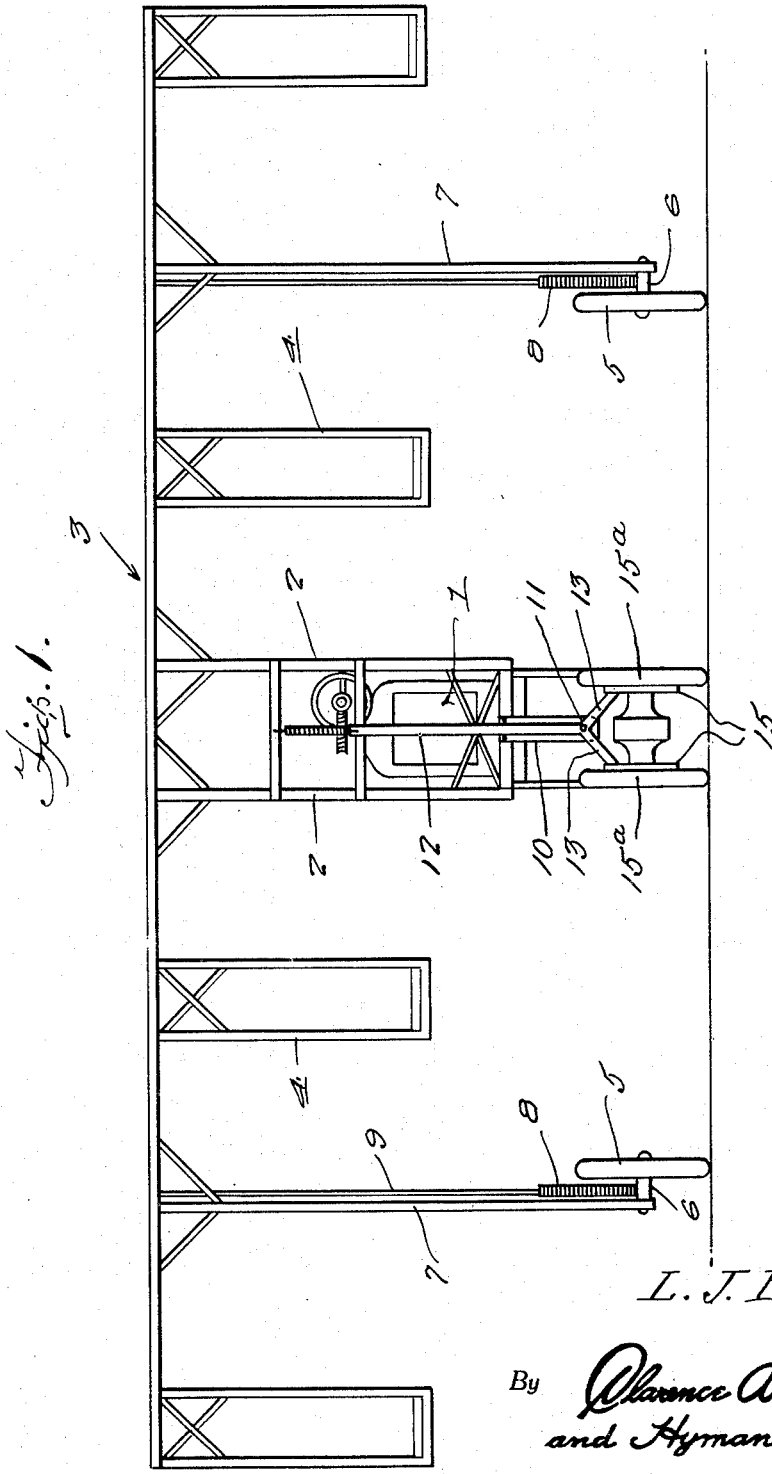
Figure 1 is a rear elevational view of an agricultural machine and illustrating the application of my invention thereto.
Figure 2:
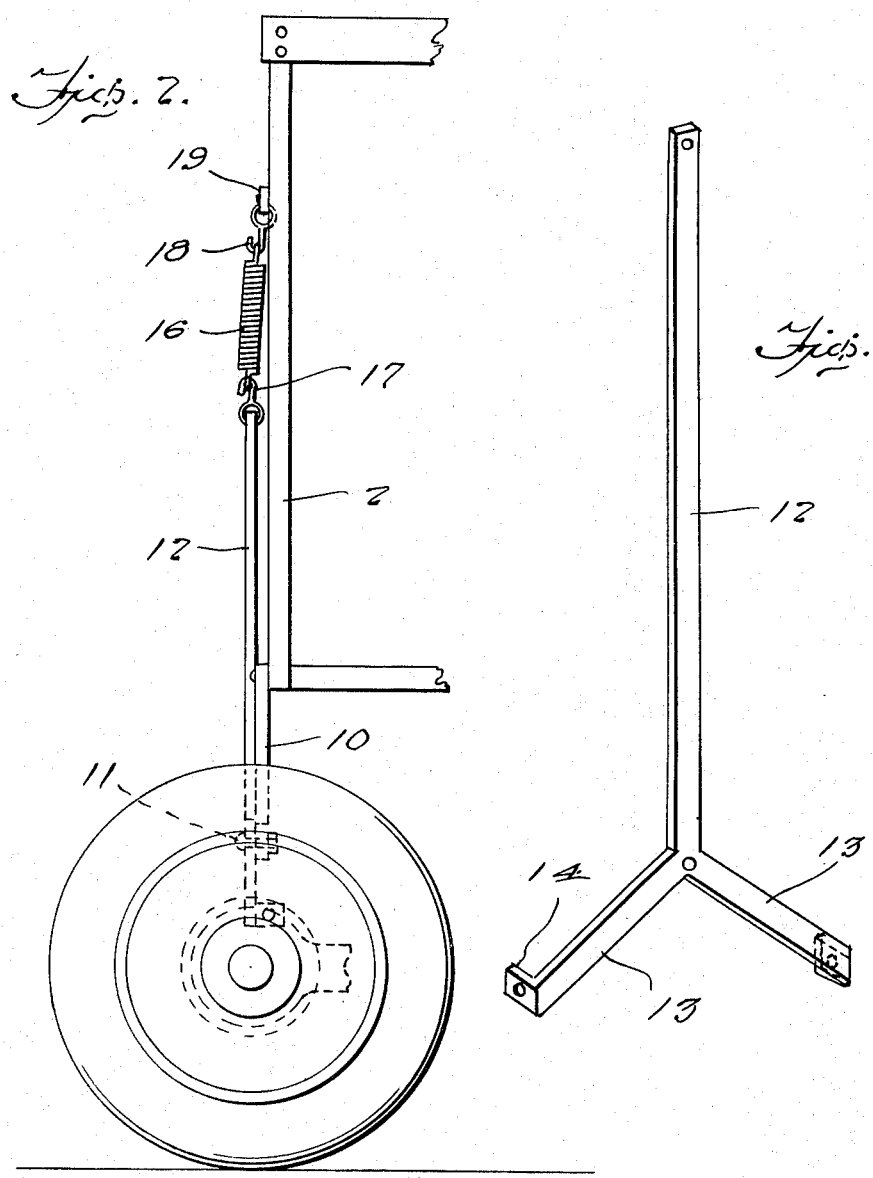
Figure 2 is a side elevational view of the supporting wheel structure.
Figures 3, 4:
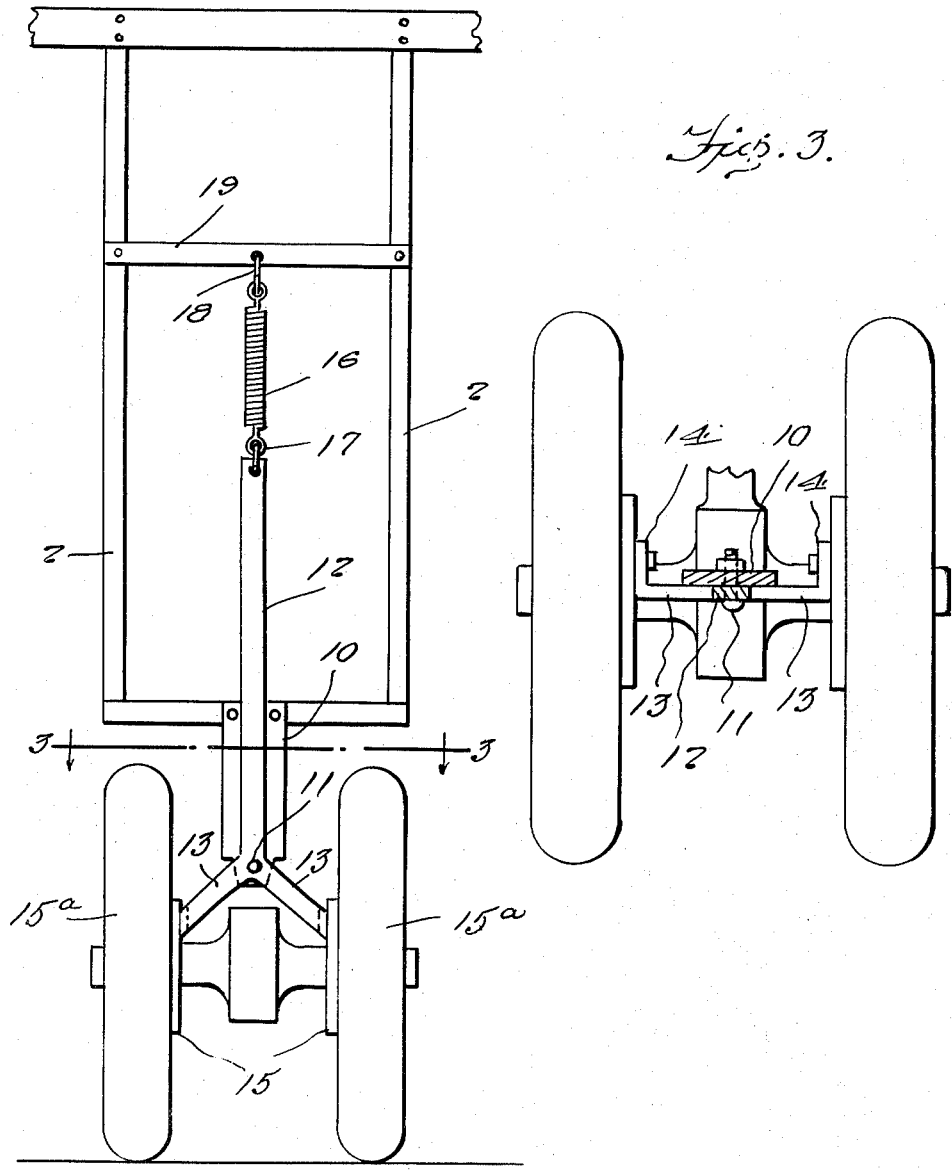
Figure 3 is a sectional view taken substantially on the line 3—3 of Figure 4.
Figure 4 is a detail elevational view illustrating certain details hereinafter more fully referred to, and Figure 5 is a perspective view of a bar forming part of the invention.

Referring to the drawings by reference numerals it will be seen that 1 indicates the motor-driven carrier from which rises uprights 2 that support a transversely elongated horizontal frame 3.

Suitably suspended from the frame 3 through the medium of hangers 4 are platforms 4a.

Opposite end portions of the frame 3 are supported through the medium of ground wheels 5 journaled on one end portion of levers 6. Levers 6 are pivoted on the lower end of bars 7 that depend from the frame 3. The wheels 5 are yieldably urged into engagement with the ground through the medium of springs 8 suitably connected with the levers 6 and also connected to rods 9 that are also suspended from the frame 3.

The machine as thus described is more fully described in my aforementioned patent and in operation it will be apparent that the machine is adapted to travel through a field of growing corn, the carrier 1 passing between two rows with the platforms 4a passing between other rows. Thus the tassels are readily removed from a plurality of rows of corn simultaneously by workmen occupying the platforms 4a. The wheels 5 materially assist in supporting the outer end portions of the frame structure 3 and the resilient mounting of the wheels permit the same to pass readily over any irregularities or obstructions that may be encountered.

The salient feature of the present invention resides in the mounting of the rear drive wheels 15a of the carrier 1. Thus it will be seen that in accordance with the present invention there is mounted on the rear end of the carrier 1 a depending plate-like bracket 10 to which is pivoted as at 11 the lower end of a bar 12. At said lower end the bar 12 is provided with diverging arms 13. At their terminals the arms 13 are provided with apertured flanges or lugs 14 through the medium of which said arms are secured to the inner sides of the brake drums 15 associated with the rear drive wheels 15a of the carrier.

The bar 12 is yieldably retained in a vertical or perpendicular position through the medium of a coil spring 16 that at one end is connected through the medium of a hook 17 with the upper end of the bar 12 and at its opposite end is anchored through the medium of a hook 18 to a crossbar 19 extending between the rear uprights 2.

It will thus be seen that the wheels 15a are so mounted as to permit one wheel to travel at a different elevation than the other. Thus the frame 3 and carrier 1 are supported by the wheels so as to remain substantially level regardless of depressions or uneven places in the ground over which one or the other of the wheels 15a may pass.

It is thought that a clear understanding of the construction, utility and advantages of an invention of this character will be had without a more detailed description thereof.

Having thus described the invention what is claimed as new is:

1. A machine of the class described comprising a carrier embodying rear drive wheels, transverse supporting frames mounted in elevated position on said carrier and extending laterally at opposite sides of the vertical plane of the carrier, workmen-supporting platforms suspended from the laterally extended portions of said supporting frame and spaced from the carrier, ground wheels for supporting the laterally extended portions of the supporting frame and connected with said portions, and means for suspending the said drive wheels of the carrier from the carrier including a bracket mounted on the carrier, a bar pivoted adjacent one end thereof to said bracket and having arms fixedly secured to the rear drive wheel assembly, and a spring device connected with said pivoted bar and yieldably urging the same to a substantially vertical or perpendicular position.

2. In a machine of the class described, a motor driven carrier embodying a rear drive wheel assembly, and suspension means for said rear drive wheel assembly including a bar pivotally mounted on the carrier at the rear end thereof to swing vertically in a direction laterally with respect to the length of the carrier, said bar having diverging arms positively secured to the rear drive wheel assembly, and a spring device anchored to the carrier and connected with said bar and yieldably urging the latter to a substantially true perpendicular position.

LESTER J. PFISTER.